United States Patent
Qian et al.

(10) Patent No.: US 7,410,308 B2
(45) Date of Patent: Aug. 12, 2008

(54) FIBER OPTIC CABLE SPLICE

(75) Inventors: Charles Qian, Gilbert, AZ (US);
Katherine X. Liu, Tucson, AZ (US)

(73) Assignee: All Optronics, Inc., Tucson, AZ (US)

(*) Notice: Subject to any disclaimer, the term of this patent is extended or adjusted under 35 U.S.C. 154(b) by 0 days.

(21) Appl. No.: 11/805,742

(22) Filed: May 24, 2007

(65) Prior Publication Data

US 2008/0069503 A1 Mar. 20, 2008

Related U.S. Application Data

(63) Continuation-in-part of application No. 11/329,413, filed on Jan. 9, 2006, now Pat. No. 7,306,382.

(51) Int. Cl.
*G02B 6/255* (2006.01)
(52) U.S. Cl. .......................... 385/95; 385/99
(58) Field of Classification Search .............. 385/95–99
See application file for complete search history.

(56) References Cited

U.S. PATENT DOCUMENTS

| 5,315,682 | A | | 5/1994 | Daguet et al. |
| 5,963,699 | A | | 10/1999 | Tanaka et al. |
| 6,152,611 | A | * | 11/2000 | Mardirossian ............... 385/99 |
| 6,773,167 | B2 | | 8/2004 | Scanzillo |
| 6,779,931 | B2 | * | 8/2004 | Murata et al. ................. 385/98 |

* cited by examiner

*Primary Examiner*—Kevin S Wood

(57) ABSTRACT

A new fiber optic cable splice for splicing optical fiber cables together and reconstructing fiber-optic cable that provide substantially enhanced reliability and broadened operating temperature range is disclosed. The disclosed cable splice offer reliable and user friendly solutions to applications in many harsh environments such as avionics, field vehicles, and defense related instrumentation. The cable splice consists of a preassembled one piece splice core and outer mechanical and thermal shielding layers. A simple splicing procedure and key fixtures are also disclosed.

40 Claims, 4 Drawing Sheets

FIBER OPTIC CABLE SPLICE

RELATED CASES/PRIORITY CLAIM

This application is a Continuation in part and claims priority under 35 USC 120 to application Ser. No. 11/329,413 filed on Jan. 9, 2006 now U.S. Pat. No. 7,306,382 and entitled "Apparatus and Method for Splicing Optical Fibers and Reconstructing Fiber-optic Cables". The pending application is incorporated herein by way of reference.

GOVERNMENT SUPPORT

This invention was made with Government support under SBIR contract No. N68335-05-C-0140 awarded by the Department of Defense. The Government may have certain rights in the invention.

BACKGROUND OF THE INVENTION

1. Field of the Invention

The present invention relates generally to the field of optical fiber communication and more particularly to the reconstruction of an optical fiber cable.

2. Background Art

In the past decade, applications involving optical fiber based communication systems are becoming more practical and are gradually replacing copper based systems. A common task required by these applications is to repair damaged fiber optic cables. There are three prior art technologies that are used to repair fiber-optic cables and the most relevant patents to this invention appear to be the one by Thomas Scanzillo, Aug. 10, 2004, U.S. Pat. No. 6,773,167; by Toshiyuki Tanaka, Oct. 5, 1999, U.S. Pat. No. 5,963,699 and by Bruno Daguet, and by Gery Marlier, May 24, 1994, U.S. Pat. No. 5,315,682. These patents are thereby included herein by way of reference.

A typical prior art fusion spliced optical fiber is illustrated in FIG. 1. The splice consists of an input optical fiber 110 with a protective coating 120, and an output optical fiber 115 with a protective coating 125. The optical fibers are joined at the interface 130 using an automated apparatus following precision alignment and discharge induced fusion splicing process. In order to protect the splicing region, a rigid rod 150 is used and typically the splice and the rigid rod are both enclosed in a heat shrinking enclosure 140.

An alternative prior art mechanical fiber-optic splice is illustrated in FIG. 2. The splice consists of an input optical fiber 210 with a protective coating 220, and an output optical fiber 215 with a protective coating 225, a capillary glass tube 250 containing a precision through channel, placed in side of a protective outer tube 240 and with protective end caps 260 and 265. Typically, the input and output fibers are placed inside of the glass capillary, an index matching fluid 230 is used to form an air free contact. For certain splices, there is an added small perpendicular channel in the capillary tube 255. To aid the fiber insertion into the glass capillary tube, two ends of the capillary tube are normally tapered to form interfacing cones. The inner diameter of the capillary tube is made substantially close to the outer diameter of the optical fiber with typical tolerances within one micrometer for a single-mode fiber splice, and a few micrometers for a multimode fiber splice. The index matching fluid is transparent and has a refractive index very close to that of the core of the optical fiber. Frequently, the optical fiber cable-splice interfaces are further protected by flexible boots 270 and 275. The prior art fiber splice is often protected with a plastic outer package (not shown) for mechanical stability.

A related prior art fiber optic cable is illustrated in FIG. 3. The cable consists of a coating protected optical fiber 310, a buffer tube 320, a layer of cable strengthening fibers 380 and an outer jacket 390. These cables are designed for reliable operation in challenging environments.

Although most of the commercially available fiber optic splices do not reconstruct the broken fiber optic cable, prior arts do exist for undersea cable reconstruction. In such a case, reconstruction is typically welded, very bulky and extensive to protect extreme undersea water pressure. Due to the small temperature fluctuations in the undersea environment, materials with substantially different coefficient of thermal expansion (i.e., stainless steel and copper) can be employed without compromising splice reliability.

These prior art approaches have several areas for improvements. For example, the plastic protective outer package of an optical fiber splice has a very limited range of operating temperature. Furthermore, in avionics applications, a fast temperature-cycled environment requires additional packaging considerations to ensure stable and reliable operations. Additionally, in order to splice fiber optic cables such as the one illustrated in FIG. 3, one must have structure improvements such that the mechanical and chemical resistance properties of the cable restored. Such a restoration needs to provide a compact packaging, mechanical and chemical integrity, as well as a thermal protection of fast changing environmental temperature. There is a need, therefore, to make improvements to these prior arts, so that highly reliable fiber-optic cable splices and reconstructed fiber-optic cables can be realized.

SUMMARY OF THE INVENTION

The present invention discloses a design of a fiber-optic cable splice that will enable fiber-optic cable reconstruction and restore optical signal connection. The new fiber-optic cable splice provides substantially enhanced mechanical and chemical reliability in a temperature cycled environment. The new splice can be employed in applications in many areas such as avionics, and automobile and defense related instrumentation. Key fixtures and procedure associated with splice installation are also disclosed.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF THE INVENTION

The present invention discloses the design of a new fiber optic cable splice to obtain a highly reliable mechanically reconstructed fiber-optic cable. The new approach departs from the prior art practice of directly splicing fiber-optic cables. The basic concept is to introduce a compact, leak-tight, thermally shielded, and mechanically robust outer package. In addition, light-cured index matching fluid may be used to permanently fix the optical fibers to the glass capillary. The new approach provides a highly reliable reconstructed fiber-optic cable for hash environment and rough handling.

Figure 1:
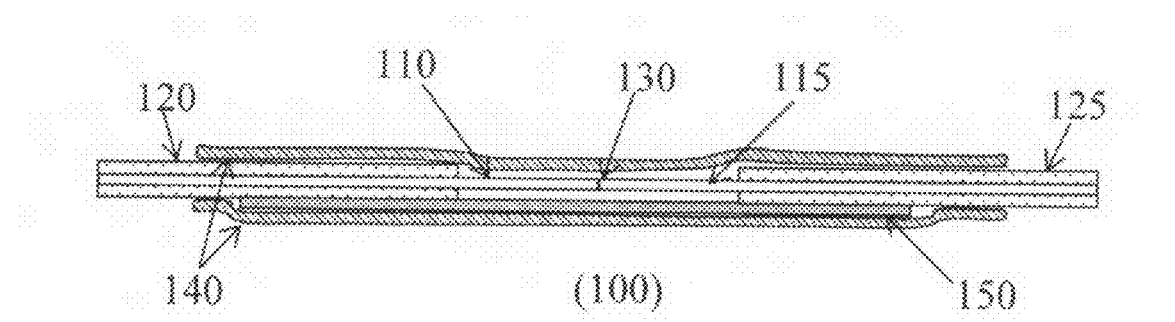
FIG. 1 shows the structure of a prior art fusion spliced optical fiber.
Figure 2:
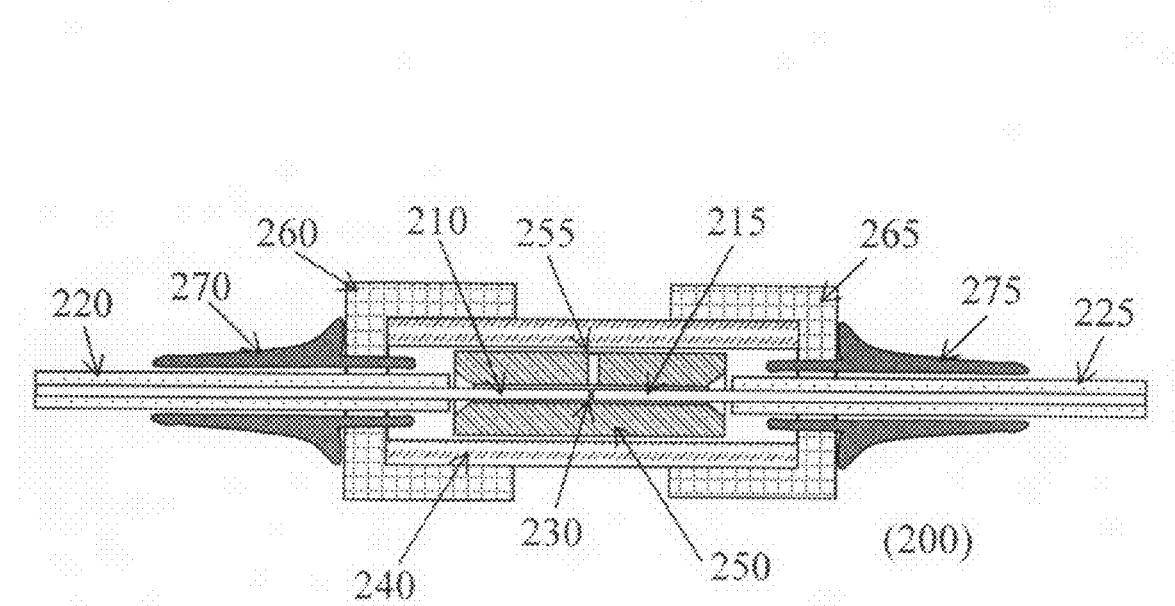
FIG. 2 displays the structure of a prior art mechanical fiber-optic splice.
Figure 3:
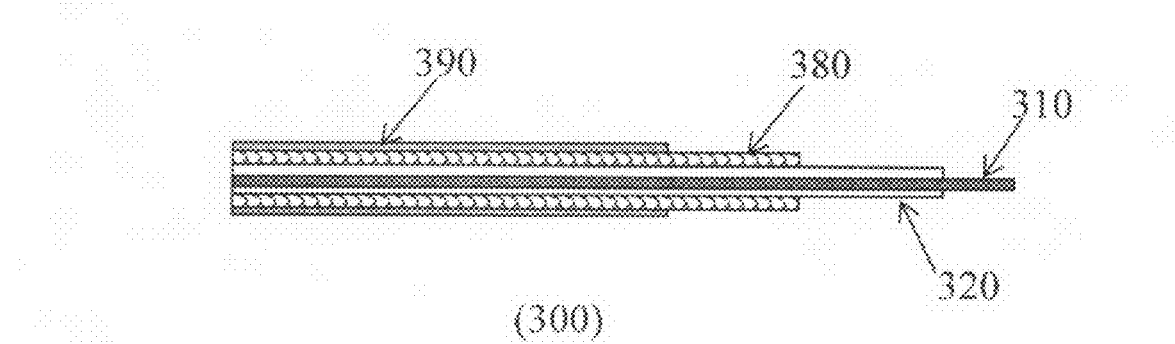
FIG. 3 illustrates the cross sectional view of a high quality prior art fiber-optic cable.
Figure 4:
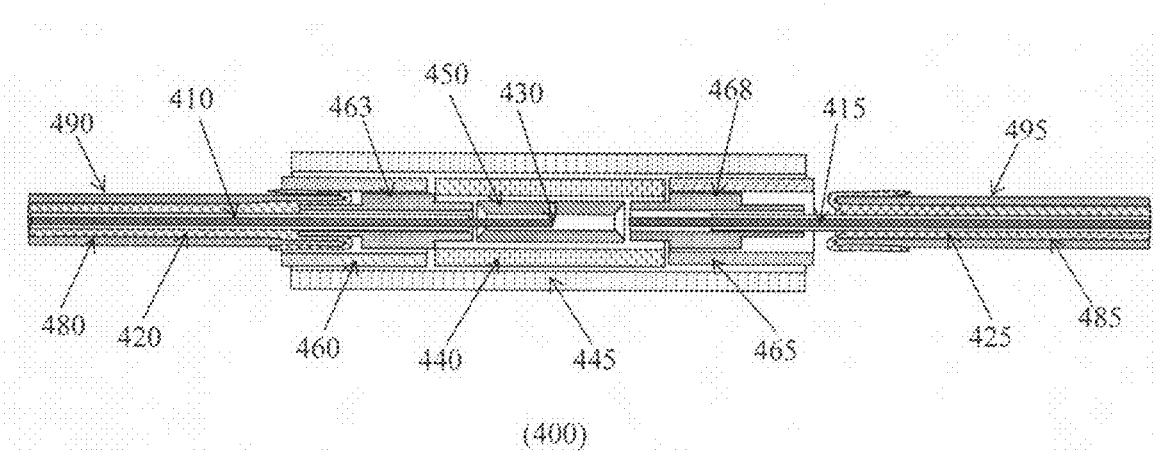
FIG. 4 depicts the cross sectional view of an improved fiber-optic cable splice incorporating a structure for reconstructed cable.

The first preferred embodiment of the present invention 400 is illustrated in FIG. 4. The core of a reconstructed fiber-optic cable consists of an input optical fiber 410 with an outer protective tube 420, an output optical fiber 415 with an outer protective tube 425, and a glass capillary tube 450 with a precision capillary channel, and two cable-splice bridging flanges 463 and 468. The glass capillary tube 450 is preferably enclosed by a protective tube 440. Typically, the ends of the optical fibers are stripped and cleaved according to splicing specifications. The ends are then inserted into the capillary tube. To aid the splicing process, the ends of the capillary tube are tapered to allow for the ease of the insertion of the optical fibers and to accommodate the loose tubes outside of the optical fiber. Light-cured index matching fluid can preferably be introduced inside of the capillary tube between the optical fiber ends to be spliced, and be cured once a desired insertion loss target is achieved. Typically the inner diameter of the capillary tube is very close to the outer diameter of the optical fiber. For single mode optical fibers, the capillary inner diameter is within one micrometer of the fiber diameter, whereas for multimode fibers it is within a few micrometers. In order to restore mechanical strength of the fiber-optic cable, the input cable strengthening fibers 480 are crimped between the cable-splice bridging flange 463 and an outer tube 460. Similarly the output fiber-optic cable strengthening fibers 485 are crimped in between a bridging flange 468 and its outer tube 465. For enhanced mechanical properties of the splice, it is preferable to have one end of the bridging flanges 463 and 468 inserted inside of the layer of the strengthening fibers. Both the input and output bridging flanges 463 and 468, are crimped with their corresponding input and output tubes 460, and 465, respectively. The mechanical property of the fiber optic cable is restored by crimping an outer tube 445 with both input tube 460 and output tube 465, at respective locations.

Figure 5:
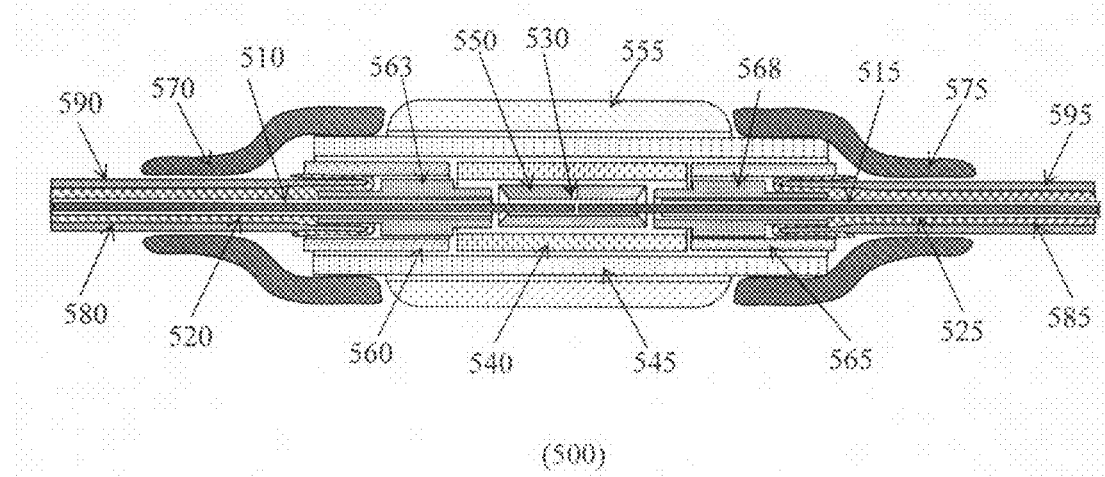
FIG. 5 shows the cross sectional view of an improved fiber-optic cable splice incorporating a structure for reconstructed cable and further incorporating thermal and mechanical stress reduction elements.

The second preferred embodiment of the present invention 500 is illustrated in FIG. 5. The core of a reconstructed fiber-optic cable consists of an input optical fiber 510 with an outer protective tube 520, an output optical fiber 515 with an outer protective tube 525, and a glass capillary tube 550 with a precision capillary channel, and two cable-splice bridging flanges 563 and 568. The glass capillary tube 550 is preferably enclosed by a protective tube 540. Typically, the ends of the optical fibers are stripped and cleaved according to splicing specifications. The ends are then inserted into the capillary tube. To aid the splicing process, the ends of the capillary tube are tapered to allow for the ease of the insertion of the optical fibers and to accommodate the loose tubes outside of the optical fiber. Light-cured index matching fluid can preferably be introduced inside of the capillary tube between the optical fiber ends to be spliced, and be cured once a desired insertion loss target is achieved. Typically the inner diameter of the capillary tube is very close to the outer diameter of the optical fiber. For single mode optical fibers, the capillary inner diameter is within one micrometer of the fiber diameter, whereas for multimode fibers it is within a few micrometers. In order to restore mechanical strength of the fiber-optic cable, the input cable strengthening fibers 580 are crimped between the cable-splice bridging flange 563 and an outer tube 560. Similarly the output fiber-optic cable strengthening fibers 585 are crimped in between a bridging flange 568 and its outer tube 565. For enhanced mechanical properties of the splice, it is preferable to have one end of the bridging flanges 563 and 568 inserted inside of the layer of the strengthening fibers. Both the input and output bridging flanges 563 and 568, are crimped with their corresponding input and output tubes 560, and 565, respectively. The mechanical property of the fiber optic cable is restored by crimping an outer tube 545 with both input tube 560 and output tube 565, at respective locations. In order to improve thermal and mechanical properties of the splice, a thermal insulating tube 555 is placed outside of the splice core whereas two flexible boots 570 and 575 are used to protect the cable-splice interface regions.

Figure 6:
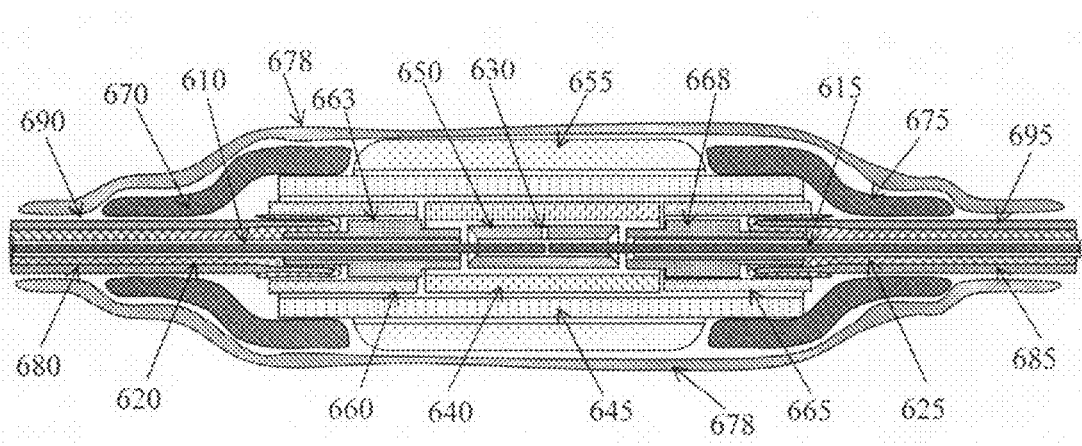
FIG. 6 displays the cross sectional view of an improved fiber-optic splice incorporating a structure for reconstructed cable and further incorporating thermal, mechanical and environmental stress reduction elements.

The third preferred embodiment of the present invention 600 is illustrated in FIG. 6. The core of a reconstructed fiber-optic cable consists of an input optical fiber 610 with an outer protective tube 620, an output optical fiber 615 with an outer protective tube 625, and a glass capillary tube 650 with a precision capillary channel, and two cable-splice bridging flanges 663 and 668. The glass capillary tube 650 is preferably enclosed by a protective tube 640. Typically, the ends of the optical fibers are stripped and cleaved according to splicing specifications. The ends are then inserted into the capillary tube. To aid the splicing process, the ends of the capillary tube are tapered to allow for the ease of the insertion of the optical fibers and to accommodate the loose tubes outside of the optical fiber. Light-cured index matching fluid can preferably be introduced inside of the capillary tube between the optical fiber ends to be spliced, and be cured once a desired insertion loss target is achieved. Typically the inner diameter of the capillary tube is very close to the outer diameter of the optical fiber. For single mode optical fibers, the capillary inner diameter is within one micrometer of the fiber diameter, whereas for multimode fibers it is within a few micrometers. In order to restore mechanical strength of the fiber-optic cable, the input cable strengthening fibers 680 are crimped between the cable-splice bridging flange 663 and an outer tube 660. Similarly the output fiber-optic cable strengthening fibers 685 are crimped in between a bridging flange 668 and its outer tube 665. For enhanced mechanical properties of the splice, it is preferable to have one end of the bridging flanges 663 and 668 inserted inside of the layer of the strengthening fibers. Both the input and output bridging flanges 663 and 668, are crimped with their corresponding input and output tubes 660, and 665, respectively. The mechanical property of the fiber optic cable is restored by crimping an outer tube 645 with both input tube 660 and output tube 665, at respective locations. In order to improve thermal and mechanical properties of the splice, a thermal insulating tube 655 is placed outside of the splice core whereas two flexible boots 670 and 675 are used to protect the cable-splice interface regions. The splice is further protected by a heat shrinking outer tube 678.

In the disclosed preferred embodiments outlined above, typically, the outer package tubes related to crimping (445, 460, 463, 465, 468, 545, 560, 563, 565, 568, 645, 660, 663, 665, and 668) are metallic and can preferably be made with low thermal expansion alloys such as Invar which is a commercially available alloy formed primarily of iron and nickel, and Kovar which is a commercially available alloy formed primarily of nickel, cobalt and iron. The flexible boots (570, 575, 670, 675) are made of rubber materials that can withstand extreme temperature conditions (from −60 to 150° C.). The protection tube enclosing the glass capillary can be made from Teflon like materials such as PTFE(poly tetra fluoro ethylene), PFA(perfluoro alkoxy), FEP(fluorinated ethylene propylene) and ETFE(ethylene tetra fluoro ethylene). The insulating layer (555 and 655) can be made with materials such as insulation fiberglass or Teflon fibers.

Figure 7:
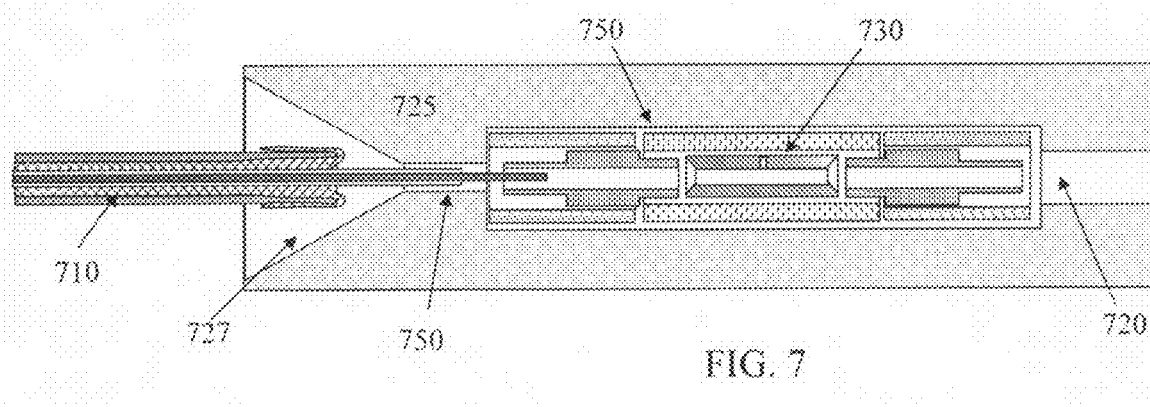
FIG. 7 illustrates an improved splice fixture consisting of base plate, Funnel like opening to aid the insertion of an optic fiber cable.

The forth preferred embodiment of the present invention is illustrated in FIG. 7. The alignment fixture of the fiber optic splice consists of two base plates 725 (only one is shown). The structure of the base plate contains a fennel like opening 727 to aid fiber cable 710 insertion, a narrower channel to allow for the alignment of the fiber cable end with the cable splice core 730, a larger chamber 750 that fits the splice core with precision, and an exit channel 720 for through optical fiber cable (not shown) in a partially (half) assembled cable splice (i.e., one of the cable already inserted and crimped). In a preferred arrangement, two of the base plates are placed together to form axially symmetric cavities which can enclosed the cable splice core and fiber cable, also enabling the insertion of an optic fiber cable end to be spliced. The two base plates can be separated which releases the partially made splice and allowing user to crimp the optical fiber cable to the cable splice core. Additionally, the two base plates are preferably attached to a mechanical clip where the opening of the clip allows for the loading of the splice core and the release of the partially assembled splice. When the clip is closed, the two base plates are brought together to form an alignment fixture where optic fiber cable ends can be inserted into the splice core as illustrated in FIG. 7.

Figure 8:
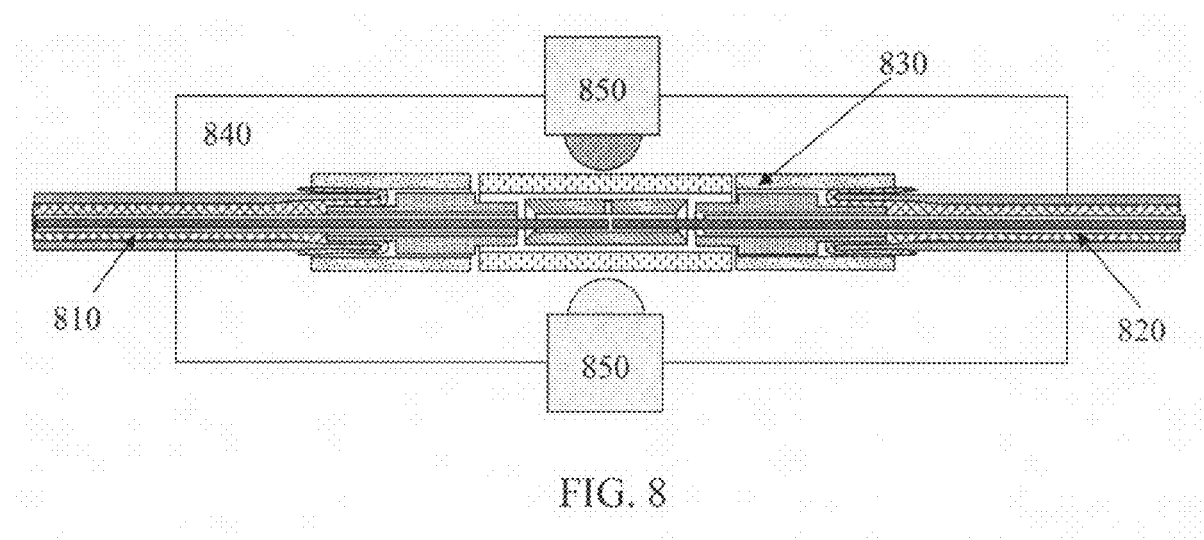
FIG. 8 shows an improved cable splice fixture consisting of an enclosure, and UV LED light source for curing the index-matching fluid.

In an additional preferred embodiment, as shown in FIG. 8, a partially assembled cable splice 830 containing an input 810 and an output 820 optical fiber cables is placed in an enclosure 840 where UV-LED are placed closely to the splice core to cure the index matching fluid. Following the cure, the index matching liquid is converted to an index matching solid which also bond the two ends of the optical fiber cables together. Typical index matching liquids are optical adhesives such as NOA61 from Norland, OG142-13 from Epotek, and UV15 from Master Bond.

Although UV-curable index matching fluid is preferred in the disclosed cable splice embodiments described above, other index matching fluids which do not need curing may also be preferred in certain applications.

A typical preferred optical fiber cable splicing procedure consists of the following steps which can be carried out in certain logical order: (a) placing outer packaging materials through the cable (heat shrink tube, rubber boots, thermal insulation, and outer crimping tube); (b) prepare optical fiber cables for the splicing (stripping outer cable jacket, stripping fiber protection tube, and cleaving optical fiber, all to specified lengths); (c) insertion of one of the optical fiber cable into the splice core with the aid of a fixture; (d) remove the partially inserted cable and splice core from the fixture; (e) complete the insertion of the cable and crimp the cable with respect to the splice core; (f) repeating steps (c), (d), and (e) for the second optical fiber cable; (g) UV cure the partially made splice in a UV curing fixture; (h) assemble and crimp the outer crimp tube to enclose the splice core; (i) assemble thermal insulation, rubber boots; and finally (j) to assemble and heat shrink the heat shrink tube.

It will be apparent to those with ordinary skill of the art that many variations and modifications can be made to the fiber-optic cable splice, fixtures and procedure disclosed herein without departing form the spirit and scope of the present invention. It is therefore intended that the present invention cover the modifications and variations of this invention provided that they come within the scope of the appended claims and their equivalents,

We claim:

1. An fiber optic cable splice comprising:
   at least an input and an output optical fiber cable;
   at least one capillary tube enclosing the ends of input and output optical fibers;
   at least two metallic cable-splice bridging flanges inserted into the input and output optical fiber cable and enclosing the input and output optical fiber;
   an index matching fluid placed inside of the capillary tube;
   a protection tube enclosing the capillary tube;
   first and second metallic crimping tubes enclosing the optical fiber cable and the cable-splice bridging flanges;
   a third metallic crimping tube enclosing the ends of optical fibers, capillary tube and protection tube, the first and second crimping tubes, and the cable-splice bridging flanges.

2. The fiber optic cable splice recited in claim 1 wherein the input and output optical fiber cables are single mode optical fiber cables.

3. The fiber optic cable splice recited in claim 1 wherein the input and output optical fiber cables are multimode optical fiber cables.

4. The fiber optic cable splice recited in claim 1 wherein the input and output optical fiber cables each have a fiber core diameter of 1 to 500 μm.

5. The fiber optic cable splice recited in claim 1 wherein the input and output optical fiber cables each have a fiber cladding diameter of 5 to 1000 μm.

6. The fiber optic cable splice recited in claim 1 wherein the input and output optical fiber cables each have cable strengthening fibers placed outside of the optical fibers.

7. The fiber optic cable splice recited in claim 6 wherein the input and output optical fiber cables each have a cable outer jacket enclosing the optical fibers and strengthening fibers.

8. The fiber optic cable splice recited in claim 1 wherein the capillary tube is made of fused silica.

9. The fiber optic cable splice recited in claim 1 wherein the capillary tube is made of glass material.

10. The fiber optic cable splice recited in claim 1 wherein the capillary tube has a square capillary cross section.

11. The fiber optic cable splice recited in claim 1 wherein the metallic cable-splice bridging flanges are made of a low thermal expansion alloy formed of nickel, cobalt and iron.

12. The fiber optic cable splice recited in claim 1 wherein the metallic cable-splice bridging flanges are made of a low thermal expansion alloy formed of nickel and iron.

13. The fiber optic cable splice recited in claim 1 wherein the index matching fluid has an index of refraction substantially close to that of the core of the optical fiber.

14. The fiber optic cable splice recited in claim 1 wherein the index matching fluid is an light cured material.

15. The fiber optic cable splice recited in claim 1 wherein the index matching fluid is a heat cured material.

16. The fiber optic cable splice recited in claim 1 wherein the index matching fluid is an air cured material.

17. The fiber optic cable splice recited in claim 1 wherein the protection tube is made of fluorinated polymer material such as polytetrafluoroethylene (PTFE), perfluoroalkoxy (PFA), fluorinated ethylene propylene (FEP), ethylenetetrafluoroethylene (ETFE).

18. The fiber optic cable splice recited in claim 1 wherein the metallic crimping tubes are made of a low thermal expansion alloy formed of nickel, cobalt and iron.

19. The fiber optic cable splice recited in claim 1 wherein the metallic crimping tubes are made of a low thermal expansion alloy formed of nickel and iron.

20. An fiber optic cable splice comprising:
at least an input and an output optical fiber cable;
at least one capillary tube enclosing the ends of input and output optical fibers;
at least two metallic cable-splice bridging flanges inserted into the input and output optical fiber cable and enclosing the input and output optical fiber;
an index matching fluid placed inside of the capillary tube;
a protection tube enclosing the capillary tube;
first and second metallic crimping tubes enclosing the optical fiber cable and the cable-splice bridging flanges;
a third metallic crimping tube enclosing the ends of optical fibers, capillary tube and protection tube, the first and second crimping tubes, and the cable-splice bridging flanges;
at least one thermally insulating tube enclosing the said capillary tube.

21. The fiber optic cable splice recited in claim 20 wherein the input and output optical fiber cables are single mode optical fiber cables.

22. The fiber optic cable splice recited in claim 20 wherein the input and output optical fiber cables are multimode optical fiber cables.

23. The fiber optic cable splice recited in claim 20 wherein the input and output optical fiber cables each have a fiber core diameter of 1 to 500 μm.

24. The fiber optic cable splice recited in claim 20 wherein the input and output optical fiber cables each have a fiber cladding diameter of 5 to 1000 μm.

25. The fiber optic cable splice recited in claim 20 wherein the input and output optical fiber cables each have cable strengthening fibers placed outside of the optical fibers.

26. The fiber optic cable splice recited in claim 25 wherein the input and output optical fiber cables each have a cable outer jacket enclosing the optical fibers and strengthening fibers.

27. The fiber optic cable splice recited in claim 20 wherein the capillary tube is made of fused silica.

28. The fiber optic cable splice recited in claim 20 wherein the capillary tube is made of glass material.

29. The fiber optic cable splice recited in claim 20 wherein the capillary tube has a square capillary cross section.

30. The fiber optic cable splice recited in claim 20 wherein the metallic cable-splice bridging flanges are made of a low thermal expansion alloy formed of nickel, cobalt and iron.

31. The fiber optic cable splice recited in claim 20 wherein the metallic cable-splice bridging flanges are made of a low thermal expansion alloy formed of nickel and iron.

32. The fiber optic cable splice recited in claim 20 wherein the index matching fluid has an index of refraction substantially close to that of the core of the optical fiber.

33. The fiber optic cable splice recited in claim 20 wherein the index matching fluid is an light cured material.

34. The fiber optic cable splice recited in claim 20 wherein the index matching fluid is a heat cured material.

35. The fiber optic cable splice recited in claim 20 wherein the index matching fluid is an air cured material.

36. The fiber optic cable splice recited in claim 20 wherein the protection tube is made of fluorinated polymer material such as polytetrafluoroethylene (PTFE), perfluoroalkoxy (PFA), fluorinated ethylene propylene (FEP), ethylenetetrafluoroethylene (ETFE).

37. The fiber optic cable splice recited in claim 20 wherein the metallic crimping tubes are made of a low thermal expansion alloy formed of nickel, cobalt and iron.

38. The fiber optic cable splice recited in claim 20 wherein the metallic crimping tubes are made of a low thermal expansion alloy formed of nickel and iron.

39. The fiber optic cable splice recited in claim 20 wherein the thermally insulating tube is made of fiber glass material.

40. The fiber optic cable splice recited in claim 20 wherein the thermally insulating tube is made of Teflon fiber material.

* * * * *